United States Patent
Getta et al.

(10) Patent No.: US 9,266,583 B2
(45) Date of Patent: Feb. 23, 2016

(54) DRIVE DEVICE FOR AN ELECTRIC BICYCLE

(75) Inventors: Udo Getta, Berlin (DE); Ullrich Noack, Berlin (DE); Karl-Heinz Fleischmann, Marienwerder (DE)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 11 days.

(21) Appl. No.: 14/128,473

(22) PCT Filed: Jun. 13, 2012

(86) PCT No.: PCT/EP2012/061184
§ 371 (c)(1),
(2), (4) Date: Jan. 27, 2014

(87) PCT Pub. No.: WO2012/175383
PCT Pub. Date: Dec. 27, 2012

(65) Prior Publication Data
US 2014/0138174 A1    May 22, 2014

(30) Foreign Application Priority Data
Jun. 21, 2011   (DE) .................. 10 2011 077 903

(51) Int. Cl.
*B62M 6/55*     (2010.01)
*F16D 67/02*    (2006.01)

(52) U.S. Cl.
CPC . *B62M 6/55* (2013.01); *F16D 67/02* (2013.01)

(58) Field of Classification Search
CPC .......... B62M 6/40; B62M 6/55; B62M 23/00; B62M 23/02
See application file for complete search history.

(56) References Cited

U.S. PATENT DOCUMENTS 2,457,430 A * 12/1948 Argyris .................. 180/206.7
7,770,682 B2 * 8/2010 Spanski ................. 180/205.4

(Continued)

FOREIGN PATENT DOCUMENTS

DE    1 935 063    1/1971
DE    43 32 303 A1  4/1994

(Continued)

OTHER PUBLICATIONS

English translation of the International Preliminary Report on Patentability for International Application No. PCT/EP2012/061184, dated Dec. 23, 2013, 6 sheets.

(Continued)

*Primary Examiner* — Joseph Rocca
*Assistant Examiner* — Gabriela C Craciun
(74) *Attorney, Agent, or Firm* — Lewis Roca Rothgerber Christie LLP

(57) ABSTRACT

A drive device for an electric bicycle, contains a drive housing in which a hollow shaft is mounted, which is connected to a chain wheel of a chain transmission of an electric bicycle, a pedal crank shaft which is arranged coaxially with respect to the hollow shaft and is connected at both ends to pedal cranks, a first clutch which is shifted depending on the rotation direction and which is arranged between the hollow shaft and the pedal crank shaft, and an electric motor whose output is connected to the hollow shaft via a second clutch which is shifted depending on the rotation direction. The hollow shaft can be coupled to the pedal crank shaft in both rotation directions of the pedal crank shaft.

19 Claims, 9 Drawing Sheets

(56) References Cited

U.S. PATENT DOCUMENTS

| | | | |
|---|---|---|---|
| 2003/0074985 A1* | 4/2003 | Liao | 73/862.195 |
| 2004/0200294 A1* | 10/2004 | Tsay et al. | 73/862.322 |
| 2006/0065460 A1* | 3/2006 | Bui | 180/220 |
| 2006/0208450 A1* | 9/2006 | Rizzetto | 280/210 |
| 2011/0180341 A1* | 7/2011 | Chan | 180/206.4 |
| 2011/0183793 A1* | 7/2011 | Chan | 474/69 |
| 2011/0183794 A1* | 7/2011 | Chan | 474/70 |
| 2011/0183805 A1* | 7/2011 | Chan | 475/254 |
| 2011/0247888 A1* | 10/2011 | Kohlbrenner | 180/206.7 |
| 2011/0303474 A1* | 12/2011 | Kimmich et al. | 180/206.3 |
| 2012/0012412 A1* | 1/2012 | Moeller et al. | 180/206.2 |
| 2013/0032425 A1* | 2/2013 | Lee et al. | 180/220 |
| 2013/0049549 A1* | 2/2013 | Folmli et al. | 310/67 A |
| 2014/0210318 A1* | 7/2014 | Yao | 310/67 R |
| 2014/0335982 A1* | 11/2014 | Bovi | 474/58 |

FOREIGN PATENT DOCUMENTS

| | | |
|---|---|---|
| DE | 298 12 461 U1 | 11/1998 |
| DE | 697 00 289 T2 | 10/1999 |
| EP | 0 765 804 A2 | 4/1997 |
| EP | 2 216 242 A1 | 8/2010 |

OTHER PUBLICATIONS

International Search Report of corresponding PCT/EP2012/061184, dated Sep. 24, 2012, 5 pages.

* cited by examiner

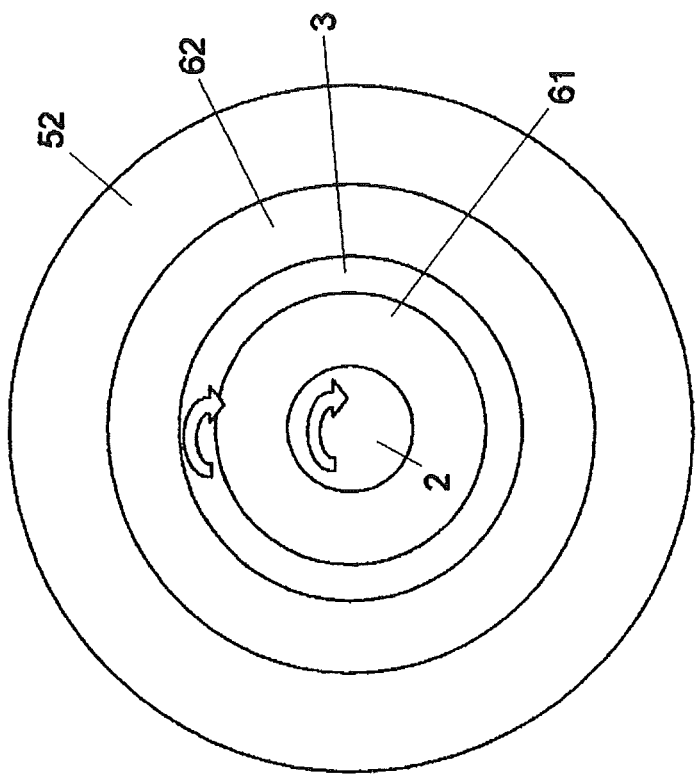
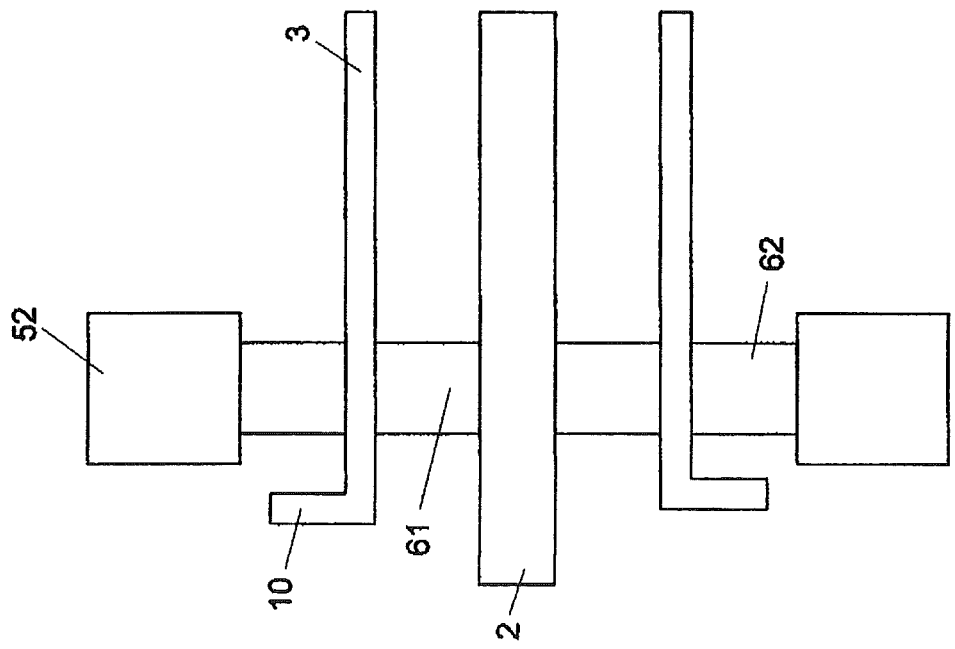

DRIVE DEVICE FOR AN ELECTRIC BICYCLE

CROSS-REFERENCE TO A RELATED APPLICATION

This application is a National Phase Patent Application of International Patent Application Number PCT/EP2012/061184, filed on Jun. 13, 2012, which claims priority of German Patent Application Number 10 2011 077 903.5, filed on Jun. 21, 2011.

BACKGROUND

The invention relates to a drive device for an electric bicycle, in particular for a Pedelec which is operated in a hybrid fashion by electric motor or by muscle force.

An electric bicycle is to be understood either as an electrical bicycle (E-bike or eBike), which is a bicycle with an additional or integrated electric motor, wherein the supply thereof with electrical energy is effected by an accumulator, or a Pedelec in case of which an electric motor does not provide any power without turning the pedals with the exception of an application as pushing or start-up aid up to a velocity of 6 km/h. In order to switch on or the control of the electric motor of a Pedelec

- the power or the torsional moment can be measured via the signal of a power sensor at the pedals, the pedal crank, the chain or at the wheel,
- the pedal velocity can be measured via the signal of a rotation number sensor,
- the velocity of the vehicle can be measured on the wheel, in particular in order to switch off the electric motor at a velocity of 25 km/h,
- the acceleration can be measured, and the measurement can be further processed mechanically or electronically in order to switch on or switch off the electric motor or to regulate continuously by means of a control function.

The power fed into the electric motor is calculated based on the sensor data depending on a selected supporting degree from the motor control such that the electric motor adds automatically a specific percentage of the power provided by the driver. The supporting degree or percentage of the power added by the electric motor can be adjusted in multiple stages or can be firmly fixed by the manufacturer or a mechanic.

A drive device with an electric drive for a bicycle operated by muscle force is known from EP 2 216 242 A1, which comprises an installation sleeve, which is anchored in a bush of a frame part of the bicycle, a crank shaft, wherein at the end thereof cranks for muscle power actuation connected to pedals are provided, and a drive sleeve arranged coaxially to the crank shaft, which is mounted in the installation sleeve. The drive sleeve contains an adapting disc at one end, which is connected to a chain wheel. A pedal crank free-wheel as clutch depending on the rotation direction is arranged between the crank shaft and the drive sleeve, while the drive sleeve is connected to the rotor of an electric motor via a drive free-wheel and a gear. Torsional moment and rotation number sensors are provided for detecting the torsional moment and the rotation number of the crank shaft, which deliver signals to an electric control, which determines the power applied by the driver and controls the electric motor for supporting the driver.

SUMMARY

It is the object of the present invention to provide a drive device of the previously mentioned kind, which allows a plurality of functions with reduced construction volume and optimal detection of the drive force supplied by muscle power or electromotive power.

The solution according to an exemplary embodiment of the invention provides a drive device for an electric bicycle, which allows a plurality of functions with a reduced construction volume, i.e. with reduced outer dimensions and optimal detection of the drive force supplied by muscle power and electro-motive power. The drive device according to the invention allows a Pedelec operation that means a bicycle function with electro-motive support, a mere electro-motive drive, for instance as pushing or start-up aid, a mere bicycle operation, for instance if the power supply of the electric motor fails, as well as in all operational types the use of a free-wheel function or back pedal function. The compact construction allows the use of conventional chain wheel sets at the pedal bearing and it can be switched from a Pedelec operation to an E-bike operation by simple change of the control function of the control device.

By integrating clutches depending on the rotation direction into the drive device different function can be realized with little effort and very space saving. Due to the coaxial arrangement of the pedal crank shaft and the hollow shaft firmly connected to the chain wheel the power generated by the driver by muscle force and the power delivered by the electric motor are summed up for the drive of the electric bicycle such that the sum of the torsional moment generated by the pedal cranks can be determined in a simple manner by a torsional moment sensor arranged on the hollow shaft.

A device for actuating a back pedal brake can be provided due to the possible coupling of the hollow shaft with the pedal crank shaft in both rotation directions of the pedal crank shaft. Said brake is arranged between the pedal crank shaft and the hollow shaft according to a further feature of the invention. In case of an opposite rotation direction to the rotation direction for forward motion of the pedal crank shaft, the first clutch depending on the rotation direction runs freely. A further clutch shifting depending on the rotation direction transfers the moment from the pedal crank shaft to the hollow shaft and allows thus the pedal back function.

Besides a freewheel function, which does not transfer a torsional moment to the pedal crank shaft and thus to the pedals during mere electro-motive drive of the hollow shaft and thus the chain wheel and chain gear of the electric bicycle or does not transfer a torsional moment from the pedal crank shaft to the electro-motive drive during mere bicycle operation, the drive device according to the invention allows thus also a back pedal brake function without changing or intervention into the freewheel function of the drive device. Therefore, the drive device can be upgraded also without problems by the device for actuating a pedal back brake.

In order to avoid that the electromotive drive generates a torsional moment opposite to the actuation rotation direction of the back pedal brake when actuating the back pedal brake and said moment is transferred to the pedal crank shaft, the electric motor is controlled by a control electronic, which is connected to sensors for detecting the rotation number, rotation direction and the torsional moment of the pedal crank shaft and which switches off the electric motor when actuating the back pedal brake, that means at a rotation direction opposite to the forward drive direction of the electric bicycle and/or opposite torsional moment of the pedal crank shaft.

The device for actuating a back pedal brake consists preferably of a clamping roller free-wheel with a first free-wheel diamond connected torque-proof to the pedal crank shaft, a switching housing with clamping rollers arranged in grooves and a switching element of an actuating free-wheel connected torque-proof with its outer surface to the housing, wherein said switching element is connected to the switching housing and is arranged coaxially free movably on the pedal crank shaft.

The clamping roller free-wheel effects that the hollow shaft connected firmly to the chain wheel can be rotated against the rotation direction of the drive device for a forward drive of the electric bicycle, wherein the first clutch shifted depending on the rotation direction and preventing said rotation direction during free-wheel operation has to be bypassed for the time of actuating the back pedal brake in order to be able to transfer a torsional moment in direction opposite to the forward drive from the pedal crank shaft to the hollow shaft. When actuating the back pedal brake, the electromotive drive is connected to the hollow shaft by the second clutch shifted depending on the rotation direction such that in this rotation direction a torsional moment can be transferred. At the same time, the control electronic switches off the electric motor at the direction reversal for actuating the back pedal brake such that it is guaranteed that when actuating the back pedal brake function, the operation is not intervened motor driven. This is effected by means of the control electronic controlling the electric motor in context with the sensor detection of the rotation number and rotation direction of the pedal crank shaft independent on the rotation number of the hollow shaft connected to the chain wheel.

In an alternative to a torque-proof connection of the switching housing arranged coaxially and free movable to the pedal crank shaft to the switching element of the actuating free-wheel, the free-wheel diamond of the actuating free-wheel connected firmly to the housing with its outer diameter can be connected torsional elastic to the switching housing.

The torsional elastic connection between the switching housing and the free-wheel diamond of the actuating free-wheel consists preferably of a cylindrical torsion or spiral spring attached to the pedal crank shaft, which is connected with one end to the switching housing and with the other end to the free-wheel diamond of the actuating free-wheel.

The torsional elastic connection of the free-wheel diamond of the actuating free-wheel to the switching housing has the advantage that the supporting moment generated by the switching housing via the clamping rollers is transferred progressively torsional elastically to the free-wheel diamond of the actuation free-wheel. Thus, an angle flexibility of the pedal crank shaft in backward rotation direction of the drive device with locked actuating free-wheel is possible and simultaneously the chain wheel firmly connected to the hollow shaft can be rotated against the forward rotation direction of the drive device within the possible rotation angle, which is provided by the blocking of the torsional or spiral spring, such that an eventually present clearance of the components of the drive device is compensated until the back pedal brake is actuated.

The motor shaft of the electric motor is connected to the hollow shaft preferably via a gear, in particular a multi-level reduction gear.

By connecting the electric motor to the hollow shaft, which is firmly connected to the chain wheel of the chain gear of the electric bicycle via a gear an adaption of the rotation number range of the electromotive drive to the rotation number range of the pedal crank shaft actuated by muscle force and the use of an electric motor, which can be operated at a high rotation number, is possible, which has a reduced size at a corresponding power delivery such that a drive device with minimal outer dimensions can be integrated into the frame of the electric bicycle.

The multi-level reduction gear between the electric motor and the motor shaft consists preferably of a two-level spur wheel gear with a pinion connected to the motor shaft, a spur wheel of large diameter of a double-gear wheel combing the pinion and an output spur wheel combing a spur wheel of small diameter of the double-gear wheel, which is connected coaxially to the hollow shaft.

A control electronic controlling the electric motor is provided, which is supplied on the input side with sensor signals, for the different operation types of the drive device (mere bicycle operation with drive force generated only by muscle force without electromotive support, hybrid operation with electromotive support of the drive force generated by muscle force, mere electromotive driven operation without muscle force actuation and in these operation types a free-wheel function or an actuation of a back pedal brake). The sensor signals provided by the sensors can be restricted due to the mere mechanical function of the clutches shifted depending on the rotation direction and the clamping roller free-wheel for actuating the back pedal brake to the rotation number and the torsional moment of the pedal crank shaft as well as the speed of movement of the electric bicycle. The control electronic processes thereby the input side sensor signals for maintaining a maximum velocity of 6 km/h during an exclusively electromotive drive as pushing or start-up aid for a Pedelec or for a maximum velocity of 25 km/h for the electromotive supported operation of a Pedelec or e-bikes permitted by law.

The detection of the torsional moment of the pedal crank shaft generated by muscle power and required for the control of the electromotive drive by the control electronic is, however, problematic. The introduction of a torsional moment into the pedal crank shaft results from the force, which is exerted onto both pedal cranks arranged at the end of the pedal crank shaft onto the pedal crank shaft. When detecting the torsional moment on the basis of the deformation of the pedal crank shaft the course of the torsion angle to be detected is not proportional to the torsional moment generated by both pedal cranks as sum of both singular moments since the course of the deformation of the pedal crank shaft is determined by the point at which the torsional moment for the muscle actuated drive is transferred from the pedal crank shaft to the hollow shaft connected to the chain wheel and thus to the chain gear of the electric bicycle. Thereby, the one pedal crank is connected to the pedal crank shaft only in a small distance to the driving chain wheel, while the other pedal crank is connected to the pedal crank shaft at the opposite end.

The torsional moment generated by the pedal cranks is however in balance to the torsional moment for driving at the chain wheel which is attached asymmetrically between the pedal cranks such that the respective pedal crank generates only a deformation of the pedal crank shaft at the respective side, where it is connected to the pedal crank shaft. For an exact detection of the sum of the torsional moment introduced by the pedal cranks a separate measurement of the torsional moment generated by each pedal crank with subsequent sum formation of both torsional moments is thus required.

Instead of a separate detection of the torsional moments introduced by the pedal cranks into the pedal crank shaft the twisting angle of the hollow shaft is measured between the first clutch shifted depending on the rotation direction and the chain wheel since the twisting angle of the pedal crank shaft between the torsional moment introduced into the hollow shaft via the first clutch shifted depending on the rotation direction to the chain wheel firmly connected to the hollow shaft is proportional to the torsional moment generated by both pedal cranks.

If a further torsional moment is introduced into the hollow shaft by the electromotive drive then the twisting angle of the hollow shaft between the first clutch shifted depending on the rotation direction and the second clutch shifted depending on the rotation direction is detected since the twisting angle between the first clutch shifted depending on the rotation direction, via which the torsional moment of the pedal crank shaft is introduced, and the second clutch shifted depending on the rotation direction, at which the torsional moment of the electromotive drive is introduced into the hollow shaft, is proportional to the torsional moment from the pedal crank shaft and thus can be measured in the area between the first and second clutch shifted depending on the rotation direction.

Thus, the solution according to the invention allows a simple and easy accessible detection of the pedal moment supplied by muscle force to the hollow shaft directly coupled to the chain gear of the electric bicycle.

Since when using the drive device according to the invention in a Pedelec a mere electromotive drive is only permitted by law up to a maximum velocity of 6 km/h and a maximum velocity with electromotive support is permitted by law until 25 km/h, the legal restrictions can be effected and maintained exclusively by the control electronic due to the decoupling of the electromotive drive from the drive actuated by muscle force effected by the mechanic effective clutches shifted depending on the rotation direction.

Accordingly, the control electronic can switch off the electric motor when exceeding a predefined velocity of the electric bicycle without introducing a torsional moment via the pedal crank shaft such that—due to the detection of the moving speed of the electric bicycle and the rotation number or torsional moment of the pedal crank shaft—the velocity allowed for a start-up aid as well as also the maximum velocity of the electric bicycle is maintained.

In order to prevent a too high of a load of the electric motor or of the accumulator feeding the electric motor the switch off of the electric motor by the control electronic can occur also when exceeding a given time frame of the continuous actuation of the electric motor.

During electromotive supported operation the rotation number and the torsional moment of the pedal crank shaft is detected and is delivered to the control electronic such that by regulated switching on of the electric motor for instance by means of pulse width modulation (PWM) or by a corresponding voltage regulation a required additional torsional moment is transferred from the electromotive drive in conformity to the rotation number via the second clutch shifted depending on the rotation direction to the hollow shaft and the advanced power of the electric bicycle is distributed onto the force supplied by the driver by means of muscle force and the electromotive generated force.

If the rotation number of the electromotive drive driving the hollow shaft becomes lager than the rotation number provided from the pedal crank shaft to the hollow shaft then the pedal crank shaft is separated via the clutch shifted depending on the rotation direction and arranged between the pedal crank shaft and the hollow shaft such that no torsional moment is transferred to the pedal crank shaft, which will provide the drive of the pedals. Thereby, the rotation number of the electric motor is re-adjusted to the required torsional moment.

A rotation number delivered by the electric motor and lower than the rotation number delivered by the pedal crank shaft does not generate a torsional moment since the electromotive drive is separated from the hollow shaft via the second clutch shifted depending on the rotation direction.

According to a further feature of the invention the degree of the power distribution between the torsional moment introduced via the pedal crank shaft and the torsional moment delivered by the electric motor can be adjusted by an operating part of the electric bicycle.

This distribution of the power supplied by the driver by muscle force and provided by the electric motor can occur in steps or continuously, wherein the power distribution is effected due to the mechanical decoupling of the pedal crank shaft actuated by muscle force from the electromotive drive under consideration of the legal requirements by the control electronic programmable preferably for the different legal requirements.

In a preferred embodiment the first and the second clutch shifted depending on the rotation direction consists of a clamping roller free wheel with an inner and outer ring and clamping bodies arranged between the inner and outer ring, wherein the inner or outer ring comprises angular faces or clamping ramps in the rotation direction of the inner and outer ring coupling the inner to the outer ring.

The electric bicycle consists preferably of an E-bike or a Pedelec, wherein the control electronic can be adjusted without a retro-active effect of the electromotive drive onto the pedal crank shaft.

Due to the compact construction of the drive device according to the invention and the thereby possible arrangement of the drive device between the pedal cranks of an E-bike or Pedelec the hollow shaft is directly connected to the chain wheel flange which can be connected either to the chain wheel or to multiple chain wheels in connection to a chain wheel gear shift.

BRIEF DESCRIPTION OF THE DRAWINGS

The invention and the different embodiments resulting from the invention shall be explained in more detail by means of embodiments which are described with reference to the Figures illustrated in the Drawings.

FIG. 3 shows a schematic longitudinal section of the drive and coupling elements for explaining the free-wheel function.

FIG. 4 shows a cross section of the schematic illustration according to FIG. 3 for explaining the free-wheel function in Pedelec operation.

DETAILED DESCRIPTION

Figure 1:
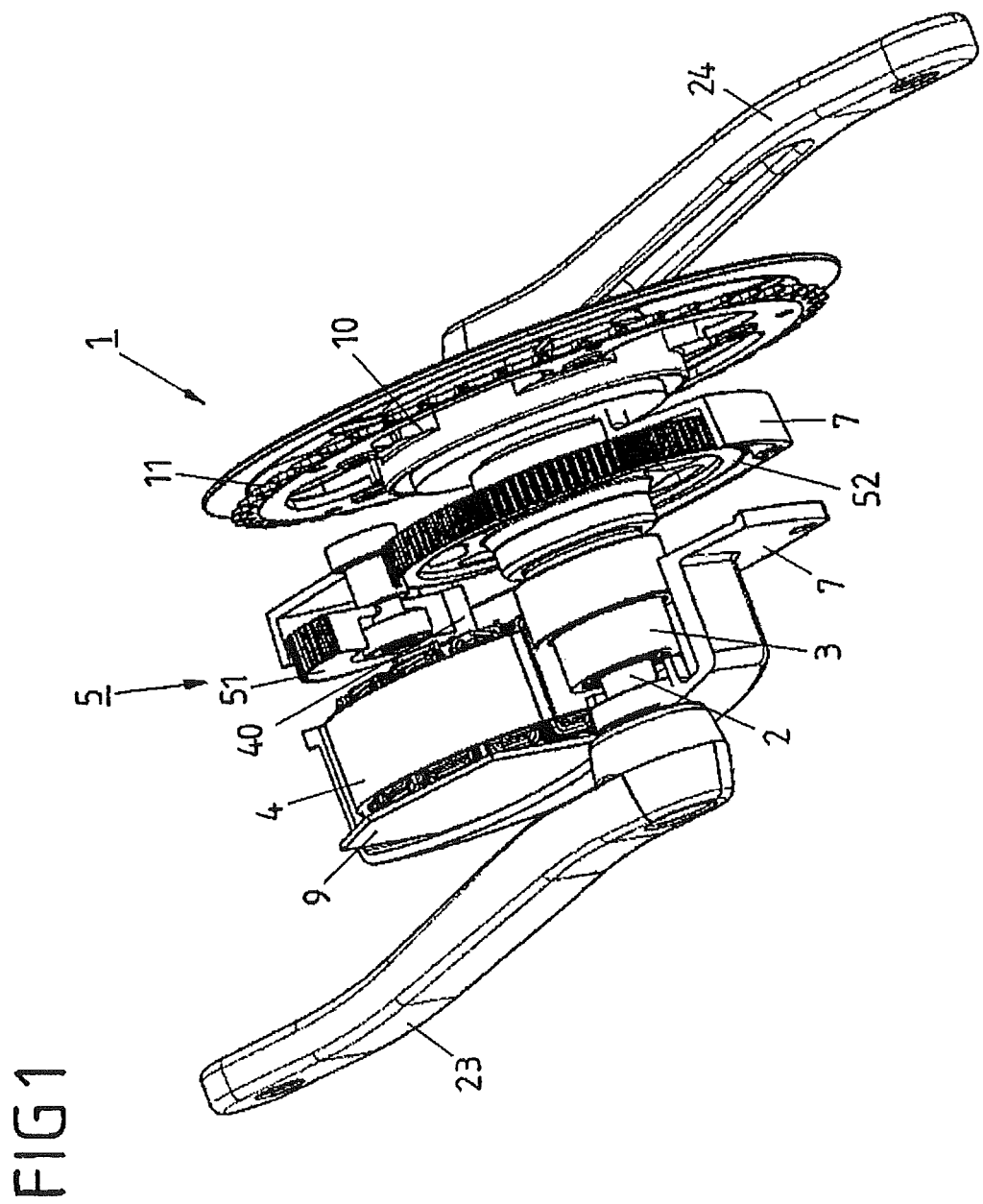
FIG. 1 shows a partially sectional perspective illustration of a drive device for a Pedelec with free-wheel function.

FIG. 1 shows in a perspective illustration a drive device 1 with free-wheel function in a sectioned housing 7 which is connected to the frame of a Pedelec or E-bike or integrated into the frame. Due to the compact construction of the drive device as deducible from FIG. 1, the drive device can be arranged between the pedals of the electric bicycle without problems such that the drive force is transferred via a chain gear with a chain wheel 11 and a chain to a chain pinion for driving the rear wheel.

The drive device 1 comprises a pedal crank shaft 2 the ends thereof are connected with pedal cranks 23, 24, at the end thereof pedals are provided in turn which are not further illustrated, onto which a muscle force is exerted during operation, which transfers via the lever arm of the pedal cranks 23, 24 a torsional moment effected by muscle force onto the pedal crank shaft 2.

The pedal crank shaft 2 is connected to a hollow shaft 3 arranged coaxially to the pedal crank shaft 2 and mounted rotatable in the housing 7 via a first clutch shifted depending on the rotation direction and formed as a clamping roller free-wheel, wherein at the one end of said hollow shaft a chain wheel flange 10 is arranged, which is connected to the chain wheel 11, which transfers the drive force or the drive torsional moment via the chain to the chain pinion connected to the rear wheel of the electric bicycle.

An electromotive force is generated by an electric motor 4, which is controlled by means of a control electronic 9, which is arranged on a circuit board connected to the electric motor 4, and which is supplied with electrical energy from a accumulator not further illustrated, which is integrated into the frame of the electric bicycle or is for instance connected to the luggage carrier of the electric bicycle.

The transitional moment delivered by the electric motor 4 via its motor shaft 40 is transferred to the hollow shaft 3 via a gear 5 and a second clutch shifted depending on the rotation direction and formed as a clamping roller free-wheel.

The gear 5 arranged between the motor shaft 40 and the second clutch shifted depending on the rotation direction, is formed as a two-level spur wheel gear, which contains a double-gear wheel 51, wherein the larger gear wheel thereof combs with a pinion connected to the motor shaft 40 and the smaller gear wheel thereof combs with an output gear wheel 52 connected to the second clutch.

Figure 2:
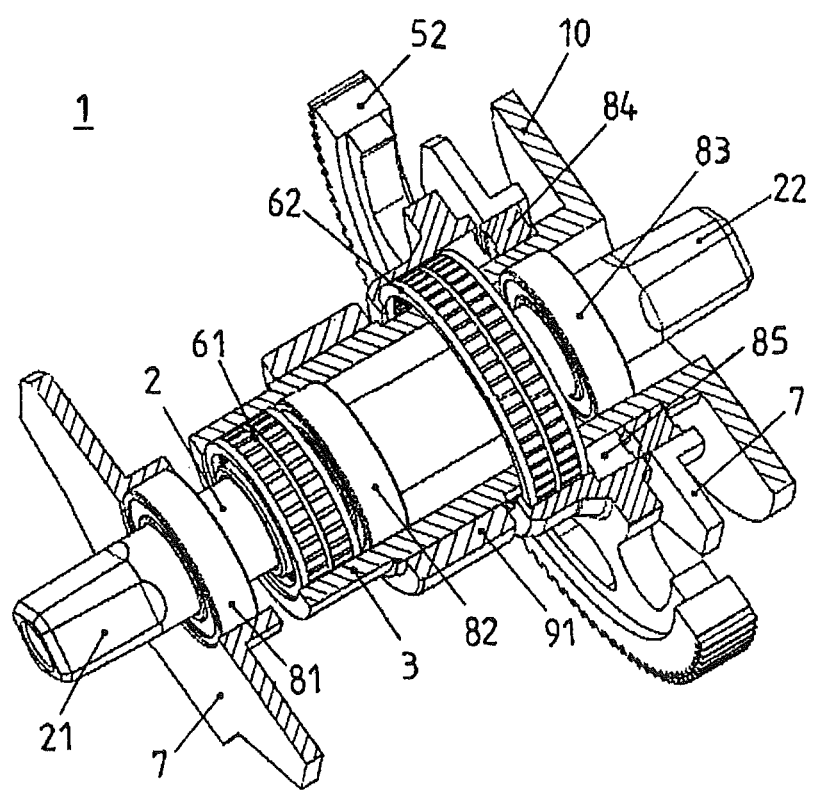
FIG. 2 shows a perspective sectional illustration of the drive device according to FIG. 1.

FIG. 2 shows in a sectional perspective illustration the drive device 1 with components of the drive device 1 arranged coaxially to the pedal crank shaft 2.

The pedal crank shaft 2 is led out on the side which is illustrated in FIG. 2 on the left, via a first ball or rolling bearing 81 rotatable out of the housing 7 of the drive device 1 such that the pin 21 of the pedal crank shaft 2 projecting out of the housing 7 can be connected to the one pedal crank 23 according to FIG. 1. The hollow shaft 3 arranged coaxially to the pedal crank shaft 2 is mounted via a second or third ball or rolling bearing 82, 83 rotatable in respect to the pedal crank shaft 2 and via a fourth ball or rolling bearing 84 rotatable in the housing 7 of the drive device 1. At its end, which is opposite to the pin 21 of the pedal crank shaft 2 projecting from the housing 7, the hollow shaft 3 is led out of the housing 7 and comprises the chain wheel flange 10 outside of the housing 7 of the drive device 1, at which the chain wheel 11 is fixed according to FIG. 1, which forms together with the chain rolling of the chain wheel 11 and the pinion of the rear wheel the chain gear of the electric bicycle.

The first clutch 61 shifted depending on the rotation direction and formed as clamping roller free-wheel is arranged between the pedal crank shaft 2 and the hollow shaft 3, which couples the pedal crank shaft 2 to the hollow shaft 3 by blocking the clamping roller free-wheel if the rotation direction of the pedal crank shaft 2 effects a forward driving of the electric bicycle. In the opposite rotation direction of the pedal crank shaft 2 the first clutch 61 shifted depending on the rotation direction effects a free-wheel between pedal crank shaft 2 and hollow shaft 3 such that the pedal crank shaft 2 can rotate independent on the hollow shaft 3.

The output gear wheel 52 of the two-level spur wheel gear 5 mounted rotatable on the hollow shaft 3 via a fifth ball or rolling bearing 85 is connected rotatable to the hollow shaft 3 via the second clutch 62 shifted depending on the rotation direction, which is preferably also formed as a clamping roller free-wheel. Since the rotation direction of the electromotive drive consisting of the electric motor 4 and the gear 5 corresponds always to the forward driving direction of the electric bicycle the rotation number difference between the rotation number of the electromotive drive, the hollow shaft 3 and the pedal crank shaft 2 is important when introducing an electromotive generated torsional moment into the hollow shaft 3. If the rotation number of the output gear wheel 52 of the electromotive drive is larger than the rotation number of the hollow shaft 3, then the second clutch 62 shifted depending on the rotation direction couples the electromotive drive firmly to the hollow shaft 3 by blocking the clamping rollers of the second clutch 62 shifted depending on the rotation direction and formed as clamping roller free-wheel such that the chain wheel 11 firmly connected to the hollow shaft 3 transfers the electromotive torsional moment to the chain gear.

If the pedal crank shaft 2 stands still due to a lack of drive actuated by muscle force, or if the pedal crank shaft 2 has a lower rotation number than the hollow shaft 3, then the first clutch 61 shifted depending on the rotation direction decouples the hollow shaft 3 from the pedal crank shaft 1, such that no torsional moment is transferred from the electromotive drive to the pedal crank shaft 2 and thus no forces occur at the pedals connected to the pedal cranks 23, 24. This free-wheel function can be used directly for an electromotive driven driving in the E-bike function or as pushing or start-up aid for a Pedelec up to 6 km/h. If the drive device according to the invention is used for a Pedelec, the electric motor 4 is switched off via the control electronic 9 when merely driving by electric motor at a larger velocity then the allowed pushing or start-up velocity of 6 km/h or when exceeding a predefined time span.

When using the drive device 1 for a Pedelec, it is required to distribute the power supplied for a forward driving of a Pedelec into a power portion generated by electric motor and transferred to the hollow shaft 3 via the second clutch 62 shifted depending on the rotation direction and into a power portion generated by muscle force and transferred from the pedal crank shaft 2 to the hollow shaft 3 via the first clutch 61 shifted depending on the rotation direction. Thereby, the rotation number of the pedal crank shaft 2 determines the rotation number of the hollow shaft 3 and thus of the chain wheel 11 for the chain drive at the rear wheel and is specified by the muscle force of the driver.

The torsional moment delivered by the pedal crank shaft 2 results from the sum of the two partial torsional moments generated by the pedal crank shafts 23, 24 and is transferred to the hollow shaft 3 in the area between the first and second clutch 61, 62 shifted depending on the rotation direction. Thus—as explained in more detail in the following—the torsional moment delivered by the pedal crank shaft 2 as well as the pedal shaft 2 can be determined by the arrangement of a torsional moment sensor between the two clutches 61, 62 shifted depending on the rotation direction at the outer circumference of the hollow shaft 3. A further sensor is provided for detecting the rotation number and rotation direction of the pedal crank shaft 2.

The power supplied by the driver by muscle force is determined from the sensor detected torsional moment and rotation number values via the control electronic 9 and the electromotive power to be delivered by the electric motor 4 for supporting the driver is controlled via the control electronic 9. The degree of the power distribution between the power generated by the driver by muscle force and the power of the electromotive drive, that means the degree of support or percentage of the power to be added by the electric motor 4, can be adjusted and controlled via an operating part.

Figure 5:
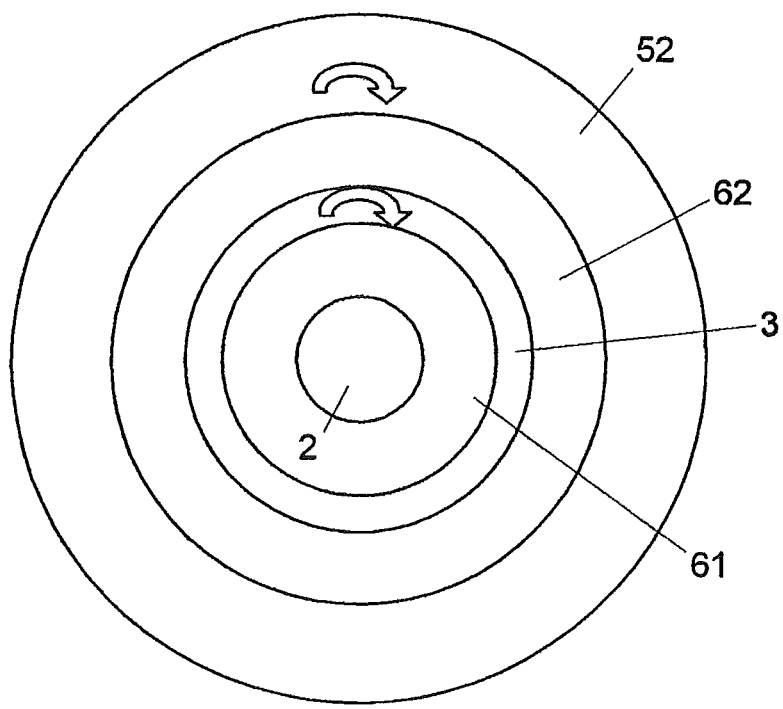
FIG. 5 shows a cross section of the schematic illustration according to FIG. 3 for explaining the free-wheel function in electric motor operation.

In FIGS. 3 to 5, the different operation types of the drive device with free-wheel function are schematically illustrated.

FIG. 3 shows schematically the flux from the pedal crank shaft 2 via the first clutch 61 shifted depending on the rotation direction to the hollow shaft 3 as well as from the output gear wheel 52 of the electromotive drive via the second clutch 62 shifted depending on the rotation direction to the hollow shaft 3 and thus to the chain wheel 11 of the chain gear of the electric bicycle firmly connected to the hollow shaft 3.

In a mere bicycle operation illustrated schematically in FIG. 4, a torsional moment is generated in the pedal crank shaft 2 via the pedal cranks 23, 24. The pedal crank shaft 2 is connected firmly to the hollow shaft 3 due to the rotational movement directed in forward driving direction via the first clutch 61 shifted depending on the rotation direction such that the torsional moment delivered by the pedal crank shaft 2 is transferred to the chain wheel 11 and thus to the chain gear of the electric bicycle.

If no force is exerted onto the pedals by the driver and therefore no torsional moment is generated in the pedal crank shaft 2 via the pedal cranks 23, 24, then usually the free-wheel connected to the chain pinion of the rear wheel becomes effective such that no rotation movement is transferred to the chain wheel 11 via the chain gear.

When driving with electromotive support, a torsional moment generated by the electromotive drive is transferred to the hollow shaft 3 via the second clutch 62 shifted depending on the rotation direction in addition to the torsional moment delivered by the pedal crank shaft 2 via the first clutch 61 shifted depending on the rotation direction such that the sum of both torsional moments is provided for the forward driving of the electric bicycle at the chain wheel 11 firmly connected to the hollow shaft 3.

FIG. 5 shows the free-wheel function of the drive device during a mere electromotive drive, wherein a torsional moment is transferred from the output gear wheel 52 to the hollow shaft 3 via the second clutch 62 shifted depending on the rotation direction and thus onto the chain wheel 11 connected to the hollow shaft 3. Thereby the pedal crank shaft 2 can stand still such that the effective direction of the free-wheel continuous opposite to the free-wheel previously described for the bicycle operation.

For detecting the allowed maximum velocity of 6 km/h for the exclusive electromotive operation of a Pedelec as pushing or start-up aid or the maximum velocity of 25 km/h for the electromotive supported hybrid operation of a Pedelec permitted by law, sensors are required, which provide sensor signals to the processing control electronics 9. For this purpose, the motion velocity of the Pedelec is detected besides the previously described sensor detection of the rotation number and the torsional moment of the pedal crank shaft 11 and is processed for the Pedelec operation.

For the distribution of the drive power at the chain wheel 11 connected to the hollow shaft into the power portion generated by the driver by muscle force and the electromotive generated power portion, it is required to detect the torsional moment of the pedal crank shaft 2. When detecting the pedal moment of the pedal crank shaft 2, which is based on a measurement of the deformation of the pedal crank shaft 2 due to the pedal forces transferred by the pedal cranks, however, mistakes or not always clear measurement results occur. The torsional moment of the pedal crank shaft 2 results from the force, which is generated by the driver onto the pedal cranks 23, 24 arranged at the shaft ends of the pedal crank shaft 2. Thereby, the course of the twisting angle to be detected for the detection of the torsional moment of the pedal crank shaft 2, is not proportional to the torsional moment generated by the two pedal cranks 23, 24 as sums of both singular moments since the course of deformation is determined by the respective point of the pedal crank shaft 2 at which the torsional moment is transferred further for the drive. Thereby, the one pedal crank 24 is connected in a small distance from the driving chain wheel 11 to the pedal crank shaft 2 while the other pedal crank 23 is arranged at the opposite end of the pedal crank shaft 2.

The torsional moment generated via the pedal cranks 23, 24 is, however, in balance with the torsional moment for driving at the chain wheel 11, wherein the chain wheel 11 is arranged asymmetrically between the pedal cranks 23, 24 and the respective pedal crank 23, 24 generates only a deformation of the pedal crank shaft 2 on the respective side. For a precise detection of the sum of the torsional moments introduced by both pedal cranks 23, 24, the separate measurement of the torsional moment generated by the singular pedal cranks 23, 24 with subsequent sum formation is thus required.

Since in the drive device 1 previously described by means of the FIGS. 1 to 5, the torsional moments generated by the pedal cranks 23, 24 is transferred to the hollow shaft 3 connected to the chain wheel 11 via the first clutch 61 shifted depending on the rotation direction, the twisting angle between the point, at which the torsional moment is introduced from the pedal crank shaft 2 into the hollow shaft 3, until the connection of the hollow shaft 3 to the free-wheel 62 is proportional to the sum of the torsional moment generated from both pedal cranks 23, 24. If a further torsional moment is introduced by the electromotive drive into the hollow shaft 3 via the second clutch 62 shifted depending on the rotation direction, then the twisting angle between the point of introducing the torsional moment by the pedal crank shaft 2 and the point of introducing the torsional moment caused by electric motor is proportional to the torsional moment from the pedal crank shaft 2 and can be measured accordingly between the two clutches 61, 62 depending on the rotation direction.

When operating the drive device 1 as start aid for a Pedelec with a mere electromotive drive up to a maximum speed of 6 km/h, the motor torsional moment delivered by the electric motor 4 is transferred via the second clutch 62 shifted depending on the rotation direction to the hollow shaft 3 connected to the drive side chain wheel 11. Since the pedal crank shaft 2 is decoupled between the pedal crank shaft 2 and the hollow shaft 3 from the hollow shaft 3 via the first clutch 61 shifted depending on the rotation direction, no torsional moment is transferred from the hollow shaft 3 to the pedal crank shaft 2 such that no motion of the pedals connected to the pedal crank shaft 2 via the pedal cranks 23, 24 can occur.

If the rotation number delivered by the electromotive drive is smaller than the rotation number of the pedal crank shaft 2 and thus smaller than the rotation number of the hollow shaft 3, then no torsional moment is delivered to the electromotive drive in opposite direction since the second clutch 62 shifted depending on the rotation direction and arranged between the electromotive drive and the hollow shaft 3 separates the electromotive drive from the hollow shaft 3.

When driving with higher speed than the permitted start-up speed of maximal 6 km/h or when exceeding the time, the electric motor 4 is switched off by the control electronic 9. Without a restriction by the control electronic 9, a mere electric drive operation of the electric bicycle or ebike operation also could be realized by the drive device according to the invention.

The drive device for a Pedelec with free-wheel operation previously described by means of the FIGS. 1 to 5 can be equipped additionally or alternatively with a device for actuating a back pedal brake. Thereby the components for actuating the back pedal brake function such that the hollow shaft 3 firmly connected to the chain wheel 11 can be rotated against the rotation direction for a forward driving operation of the electric bicycle.

For this purpose the first clutch 61 shifted depending on the rotation direction and preventing this rotation direction of the hollow shaft 3 has to be bypassed for the time of actuating the back pedal brake so that a torsional moment can be transferred from the pedal crank shaft 2, which is connected via the pedal cranks 23, 24 to the pedals of the Pedelec actuated by muscle power, to the hollow shaft 3 in opposite direction. When actuating the back pedal brake, the electromotive drive is connected to the hollow shaft 3 by the second clutch 62 shifted depending on the rotation direction for this rotation direction such that a torsional moment is transferred from the hollow shaft 3 to the electromotive drive. Simultaneously, when actuating the back pedal brake, the electric motor 4 is switched off since it would otherwise generate a torsional moment against the actuating rotation direction of the back pedal brake.

The switch-off of the motor operation is effected by the control electronic 9 controlling the electric motor 4 in connection with the sensor detection of the rotation number and rotation direction of the pedal crank shaft 2 connected to the pedal cranks 23, 24, independent on the rotation number of the hollow shaft 3 firmly connected to the chain wheel 11, in that the control electronic 9 switches off the electric motor 4 by direction reversal of the torsional moment on the hollow shaft 3 detected by sensors for the forward driving operation of the Pedelec and thus guarantees that when actuating the back pedal brake no electromotive intervention into the operation occurs.

Figure 6:
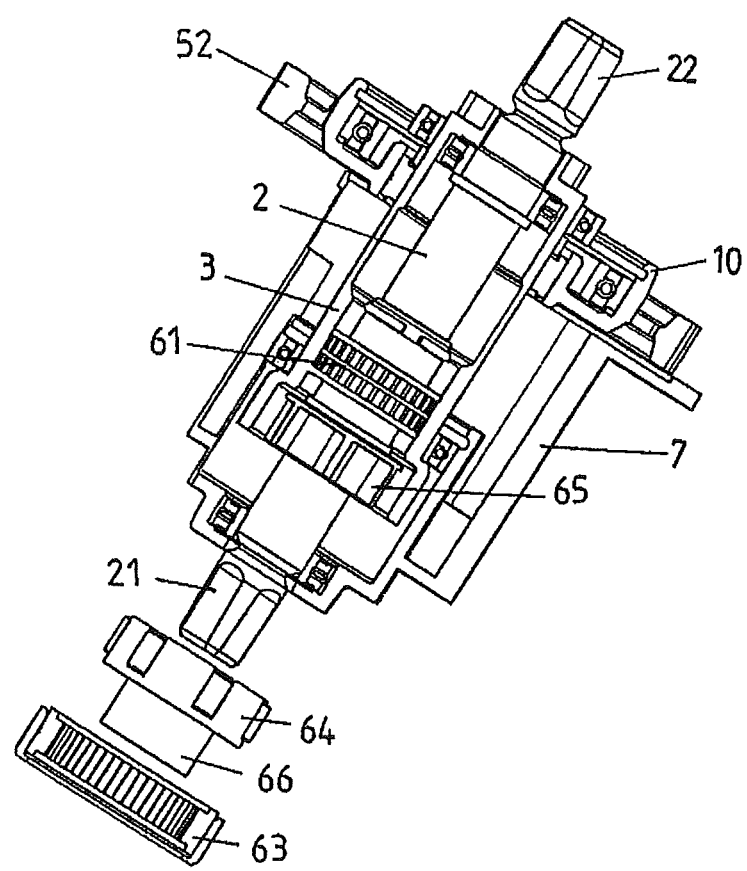
FIG. 6 shows an explosive illustration of a drive device with a device for actuating a back pedal brake.
Figure 7:
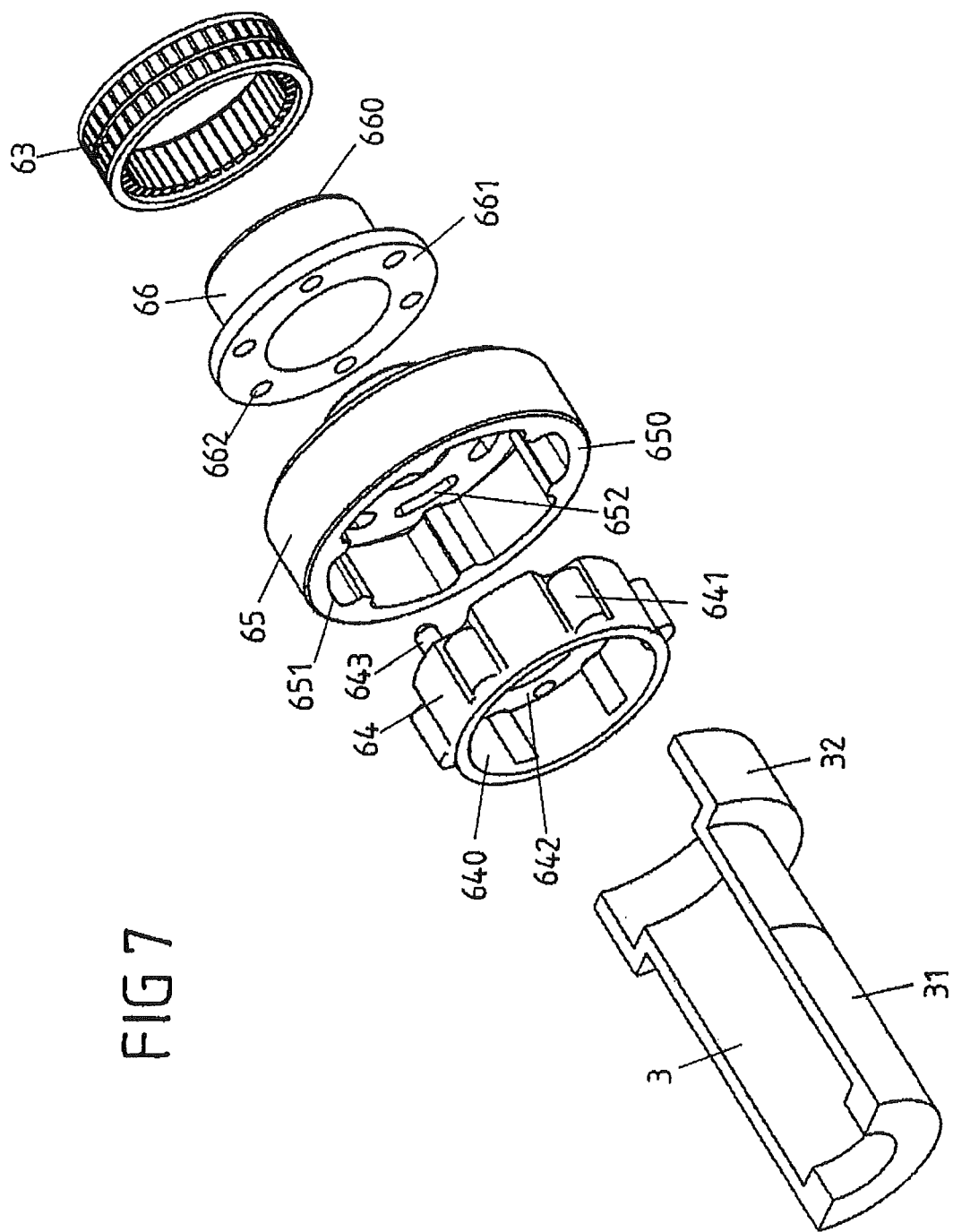
FIG. 7 shows an explosive illustration of the coupling elements and free-wheels of the device for actuating the back pedal brake.
Figure 8:
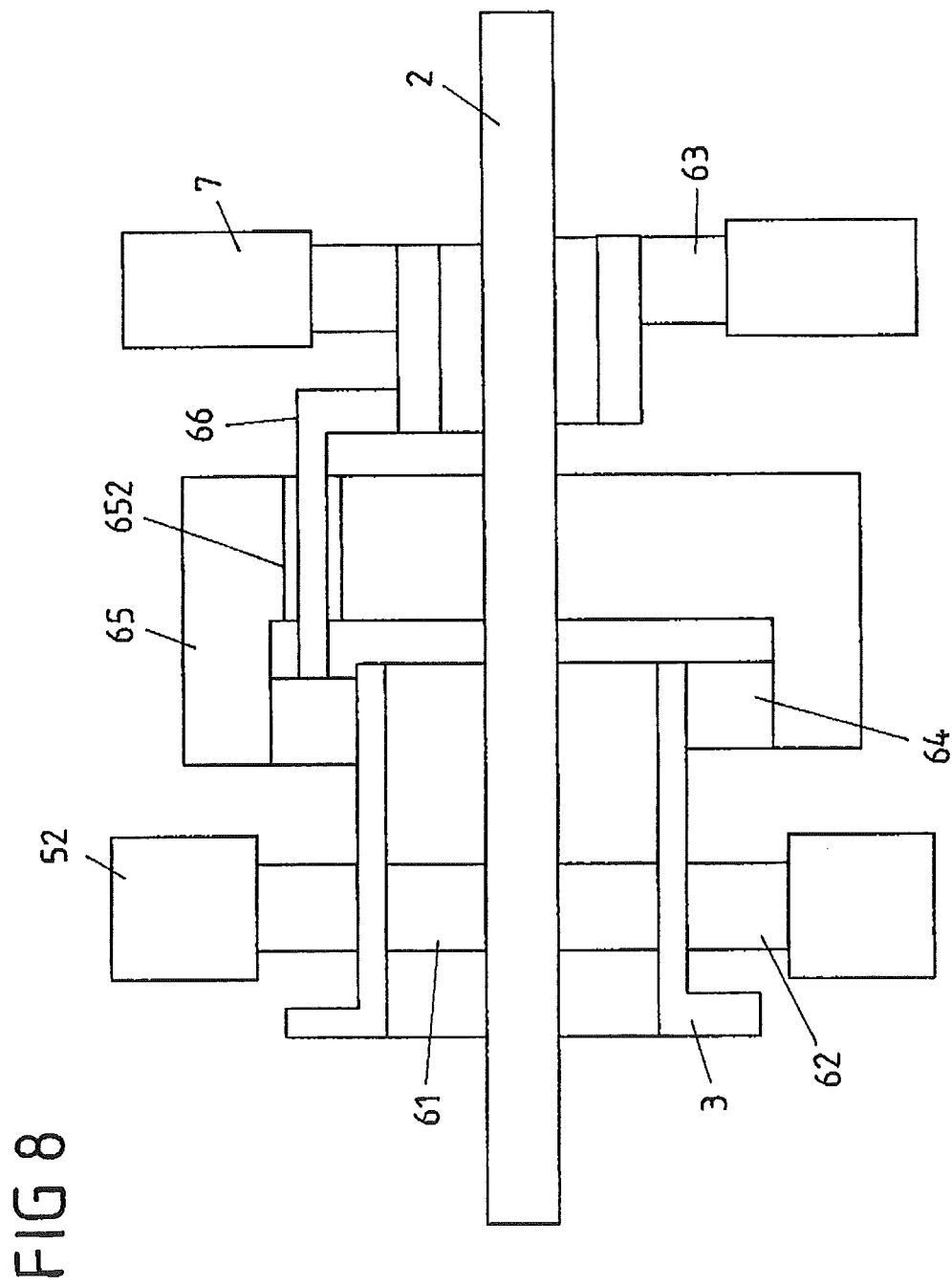
FIG. 8 shows a schematic longitudinal section of the drive and coupling elements of the drive device and device for actuating the back pedal brake.
Figure 9:
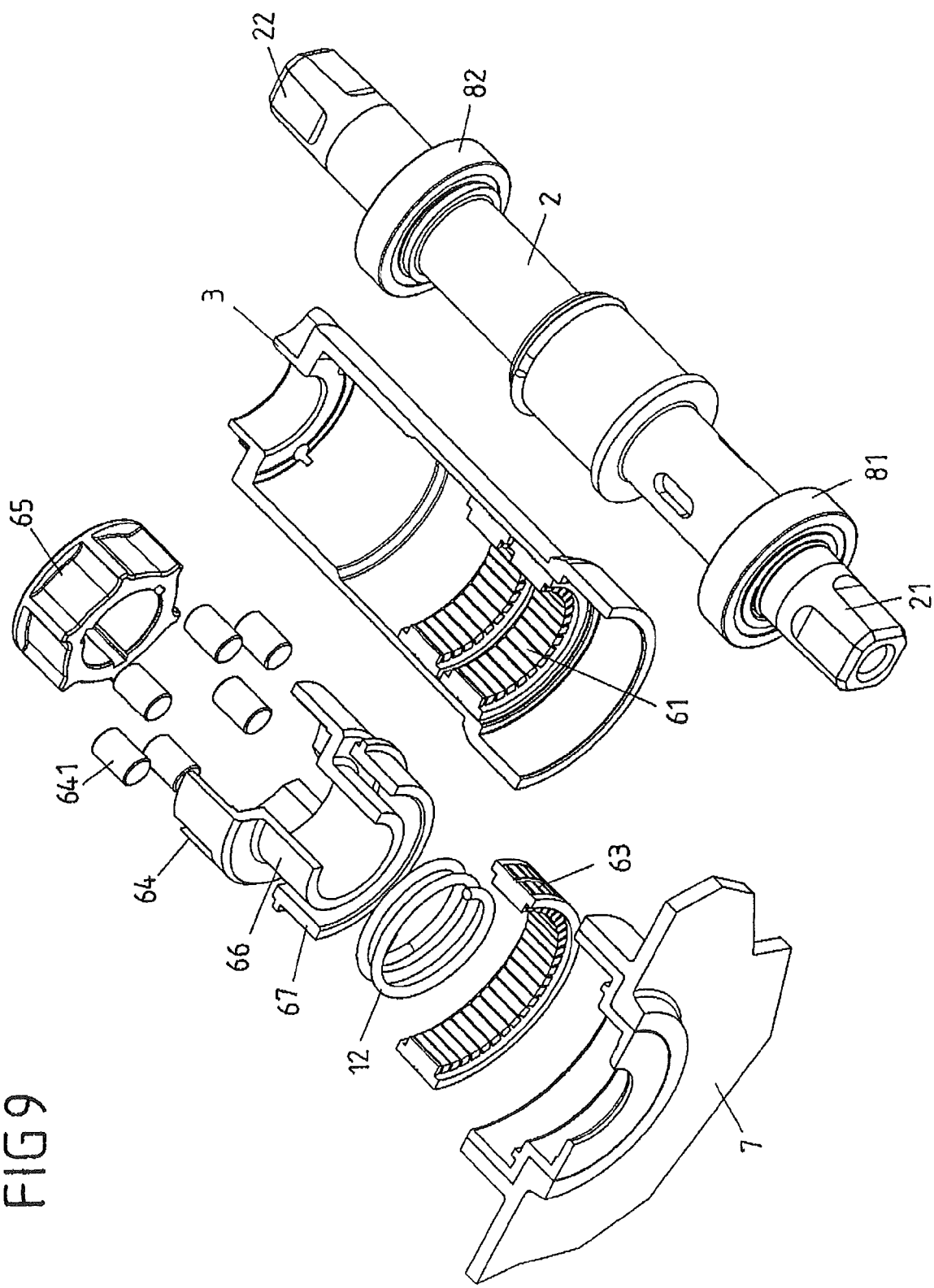
FIG. 9 shows an explosive illustration of the drive device with back pedal function and torsional elastic connection of a part of components enabling the back pedal function.
Figure 10:
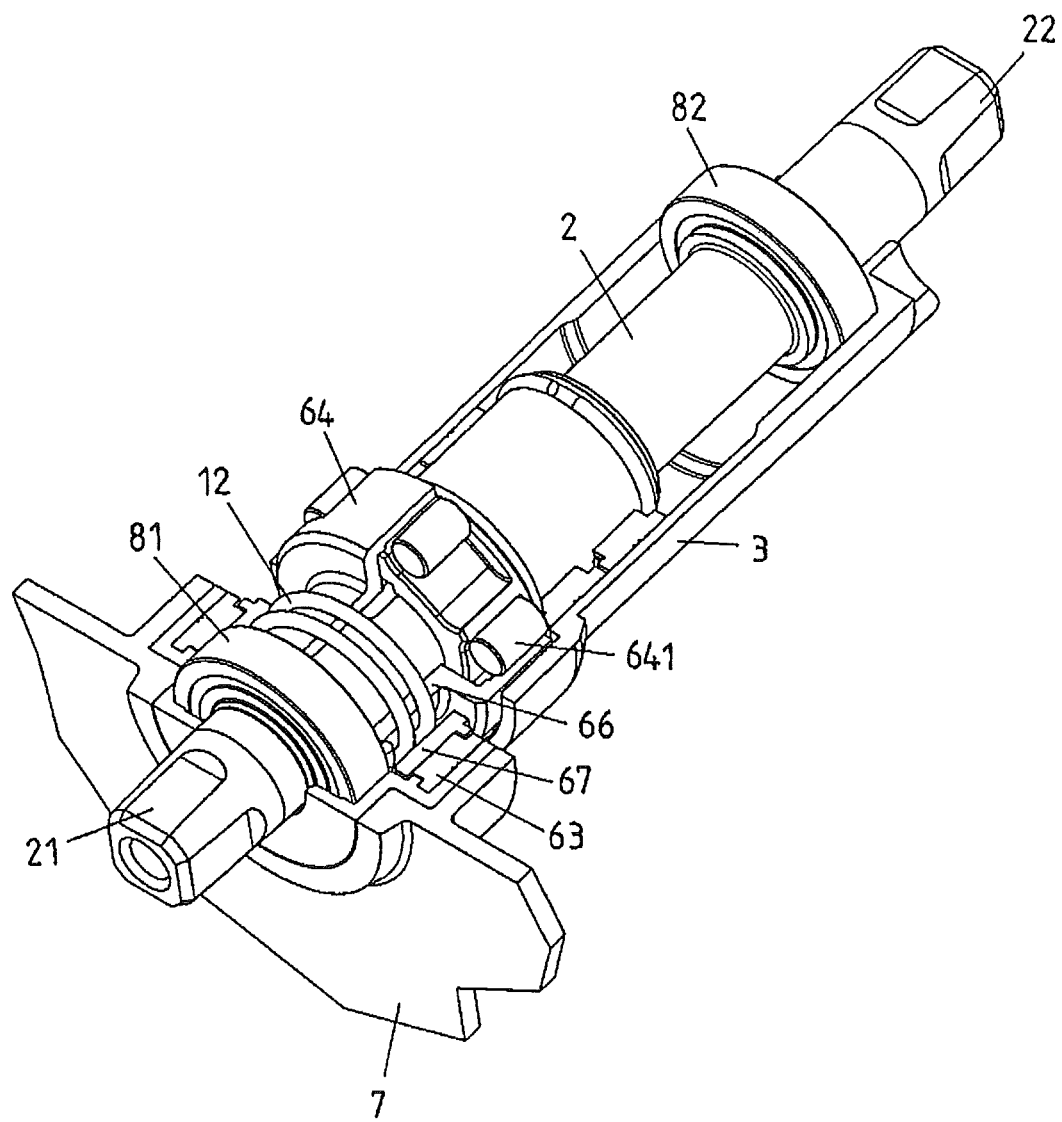
FIG. 10 shows a partially sectioned perspective illustration of the drive device with back pedal function according to FIG. 9.

The drive device 1 comprises for realizing a back pedal brake according to FIGS. 6 to 10 a clamping roller free-wheel which comprises according to the FIGS. 6 to 8 an actuating free-wheel 63, the cylindrical outer surface thereof is connected torque-proof to the housing 7 and to a switching element 66 arranged coaxially free movable to the pedal crank shaft 2, a free-wheel cage 65 connected torque-proof to the pedal crank shaft 2 with a cup-shaped housing 650 with an angular face 651 arranged at the cylindrical inner surface and slotted holes 652 arranged in the circular-shaped floor, a switching housing 64 inserted into the free-wheel cage 65 with a cup-shaped housing 640 with clamping rollers 41 arranged in the grooves of its cylindrical outer surface and holes or pins 643 arranged in its circular-shaped floor 642, a switching element 66 with a cylindrical-shaped body 660 and a ring-flange 661 with holes 662 for receiving pins 643 arranged on the circular-shaped floor 642 of the switching housing 64 and guided through the slotted holes 652 of the free-wheel cage 65 or fastening means, which are inserted through the hole in the circular-shaped floor 642 of the switching housing 64, the slotted holes 652 of the free-wheel cage 65 and holes 662 of the switching element 660, and which connects the switching element 66 to the switching housing 64.

The actuation of the back pedal brake occurs in that the hollow shaft 3 firmly connected to the chain wheel 11 is rotated via the clamping roller free-wheel against its rotation direction during forward driving, wherein the free-wheel cage 65 is in firm connection to the pedal crank shaft 2 and thus the torsional moment supplied by the pedal cranks 23, 24 opposite to the rotation direction of their actuation in forward driving direction onto the pedal crank shaft 2 is transferred to the chain wheel 11. For receiving and supporting the clamping rollers 641 in the switching housing 64, the hollow shaft 3 comprises in axial direction besides a first hollow cylindrical section 31 for receiving the components of the drive device previously described by means of the FIGS. 1 to 5 a second extended hollow cylindrical section 32.

The tensioning of the clamping roller free-wheel and thus the creation of a torque-proof connection between the hollow shaft 3 and the pedal crank shaft 2 in a rotation direction of the pedal crank shaft 2 opposite to the forward driving direction of the electric bicycle for actuating the back pedal brake occurs via the switching housing 64, which is connected torque-proof to the switching element 66, wherein the switching element 66 is connected to the actuating free-wheel 63, the outer surface thereof being anchored torque-proof of the housing 7. The switching element 66 of the actuating free-wheel 63 connected to the switching housing 64, is arranged in contrast coaxially free movable to the pedal crank shaft 2.

With a pedal crank shaft 2 rotating in forward driving direction, the actuating free-wheel 63 does not transfer a torsional moment such that the clamping rollers 641 of the switching housing 64 are maintained in a position in respect to the angular faces 651 of the free-wheel cage 65 where no connection between the hollow shaft 3 and the pedal crank shaft 2 is obtained.

The first clutch 61 shifted depending on the rotation direction and provided for the driving operation of the Pedelec releases the torque-proof connection between the hollow shaft 3 and the pedal crank shaft 2 in rotation direction of the pedal crank shaft 2 opposite to the driving direction. The free-wheel cage 65 being torque-proof on the pedal crank shaft 2 moves the clamping body 641 of the switching housing 64 in clamping direction against the hollow shaft 3 via its angular faces 651. Simultaneously, the clamping body 641 guided in the grooves of the switching housing 64 moves the switching housing 64 opposite to the free-wheel direction of the actuating free-wheel 63. Thus, the actuating free-wheel 63 locks and holds the switching housing 64 such that the pedal crank shaft 2 and the hollow shaft 3 are connected torque-proof to each other against the forward driving direction of the electric bicycle and the chain wheel 11 connected to the hollow shaft 3 can transfer the back pedal brake force via the chain to the chain pinion of the rear wheel and thus can activate the back pedal brake function.

In an alternative or in addition to the previously described embodiment of the clamping roller free-wheel for the actuation of the back pedal brake, the switching housing 64 can be connected instead of a torque-proof connection to the switching element 66 also torsional elastic to the switching element 66. For this purpose, according to the FIGS. 9 and 10, in which the further components of the clamping roller free-wheel with the same reference signs match to the previously described components such that they are referenced here, a cylindrical torsion or spiral spring 12 is mounted on the pedal crank shaft 2. One end of the torsion spring 12 is firmly connected to a free-wheel diamond 67 of the actuating free-wheel 63, while the other end of the torsion spring 12 is fixed to the switching housing 64.

The torsional elastic connection of the free-wheel diamond 67 of the actuating free-wheel 63 to the switching housing 64 has the advantage that the supporting moment generated by the switching housing 64 via the clamping rollers 641 is transferred progressively torsional elastically to the free-wheel diamond 67 of the actuating free-wheel 63. Hereby, an angle movement of the pedal crank shaft 2 is possible in backwards rotation direction with locked actuating free-wheel 63. Simultaneously, the chain wheel 11 can be rotated against the forward direction within the possible rotation angle, which is provided by blocking the torsion spring 12, and thus an eventually present clearance can be compensated until actuating the back pedal brake.

The invention claimed is:

1. A drive device configured to be operated in a hybrid fashion by an electric motor and by muscle force, the drive device comprising:
   a drive housing, in which a hollow shaft is mounted, which is connected to a chain wheel of a chain transmission of an electric bicycle,
   a pedal crank shaft, which is arranged coaxially in respect to the hollow shaft and which is connected at both ends to pedal cranks,
   a first clutch, which is arranged between the hollow shaft and the pedal crank shaft and is configured to be shifted depending on a rotation direction and
   an electric motor, whose output is connected to the hollow shaft via a second clutch which is configured to be shifted depending on the rotation direction, wherein
   the hollow shaft can be coupled to the pedal crank shaft in both rotation directions of the pedal crank shaft.

2. The drive device according to claim 1, wherein a device for actuating a back pedal brake is arranged between the pedal crank shaft and the hollow shaft, wherein the device for actuating a brake pedal is inactive when said first clutch couples said pedal crank shaft to said hollow shaft in a first direction of rotation and wherein the device for actuating a brake pedal couples said pedal crank shaft to the hollow shaft in a second opposite direction of rotation.

3. The drive device according to claim 1, wherein the electric motor can be controlled by a control electronic, which is connected to sensors for detecting a rotation speed, the rotation direction and a torsional moment of the pedal crank shaft and switches off the electric motor at a rotation direction opposite to the forward moving direction of the electric bicycle and/or an opposite torsional moment of the pedal crank shaft.

4. The drive device according to claim 2, wherein that the device for actuating the back pedal brake consists of a clamping roller free wheel with a free- wheel cage connected torque-proof to the pedal crank shaft, a switching housing with clamping rollers arranged in groves and with a switching element of an actuating free-wheel connected with its outer surface torque-proof to the housing, wherein said switching element is connected to the switching housing and arranged coaxially free- movable on the pedal crank shaft.

5. The drive device according to claim 4, wherein the switching element is connected in a circumferential direction torsional elastically to the switching housing.

6. The drive device according to claim 5, wherein the switching element is connected to the one end and the switching housing is connected to the other end of a cylindrical torsion or spiral spring attached on the pedal crank shaft.

7. The drive device according to claim 1, wherein the motor shaft of the electric motor is connected via a gear and the second clutch is shifted depending on the rotation direction is connected to the hollow shaft.

8. The drive device according to claim 1, wherein the gear comprises a multi-level reduction gear.

9. The drive device according to claim 8, wherein the multi-level reduction gear is designed as a two-level spur wheel gear with a pinion connected to the motor shaft, with a spur wheel of large diameter of a double-gear wheel combining with the pinion and with an output spur wheel combining with a spur wheel of small diameter of the double-gear wheel, which is connected coaxially to the hollow shaft.

10. The drive device according to claim 1, wherein a control electronic controlling the electric motor is supplied with the output signal of a sensor detecting the velocity of the electric bicycle.

11. The drive device according to claim 1, wherein torsional moments introduced via the pedal cranks are detected separately and are delivered to a control electronic, which sums the torsional moments introduced via the pedal cranks.

12. The drive device according to claim 1, wherein an actual twisting deformation of the hollow shaft between the first clutch shifted depending on the rotation direction and the chain wheel is measured for detecting torsional moments introduced via the pedal cranks.

13. The drive device according to claim 1, wherein a twisting deformation of the hollow shaft between the first clutch shifted depending on the rotation direction and the second clutch shifted depending on the rotation direction is detected for detecting torsional moments introduced via the pedal cranks with additional introduction of a torsional moment delivered by the electric motor.

14. The drive device according to claim 1, wherein a control electronic switches off the electric motor when exceeding a specific velocity of the drive device without introducing a torsional moment via the pedal crank shaft.

15. The drive device according to claim 1, wherein a control electronic re-adjusts the rotation number of the electric motor to an adjustable torsional moment if the pedal crank shaft is separated from the hollow shaft by the first clutch shifted depending on the rotation direction.

16. The drive device according to claim 15, wherein the degree of power distribution between the torsional moment introduced via the pedal crank shaft and the torsional moment delivered by the electric motor can be adjusted.

17. The drive device according to claim 1, wherein a first and second switch shifted depending on the rotation direction consists of a clamping roller free-wheel with an inner and outer ring and clamping bodies arranged between the inner and outer ring, wherein the inner or outer ring comprise clamping ramps in the rotation direction of the inner or outer ring coupling the inner to the outer ring.

18. The drive device according to claim 1, wherein a control electronic is configured to control the electromotive drive without a reaction effect onto the pedal crank shaft.

19. The drive device according to claim 1, wherein the hollow shaft is connected to a chain wheel flange, which can be connected to the chain wheel or to multiple chain wheels.

* * * * *